United States Patent [19]
Neitzel et al.

[11] 3,887,897
[45] June 3, 1975

[54] SYSTEM FOR CHANGING SEISMIC DETECTION ARRAY LENGTHS

[75] Inventors: Edwin B. Neitzel, Dallas; Marvin D. Gontarek, Richardson, both of Tex.

[73] Assignee: Texas Instruments Incorporated, Dallas, Tex.

[22] Filed: July 23, 1973

[21] Appl. No.: 381,812

[52] U.S. Cl.... 340/7 R; 340/15.5 MC; 340/15.5 GC
[51] Int. Cl............................................. G01v 1/16
[58] Field of Search..... 340/7 R, 15.5 MC, 15.5 CP, 340/15.5 GC

[56] References Cited
UNITED STATES PATENTS

| | | |
|---|---|---|
| 2,798,211 | 7/1957 | Smith.................................. 340/7 R |
| 3,133,262 | 5/1964 | Strange............................... 340/7 R |
| 3,307,145 | 2/1967 | Dunster et al............... 340/15.5 GC |
| 3,539,984 | 11/1970 | Schneider.................... 340/15.5 CD |

*Primary Examiner*—Maynard R. Wilbur
*Assistant Examiner*—H. A. Birmiel
*Attorney, Agent, or Firm*—Hal Levine; Leo N. Heiting; Rene' E. Grossman

[57] ABSTRACT

A system is disclosed wherein selections are available at a marine seismic survey boat which allows an operator to change the effective array length in integer multiples of the length of a unit array with array centers maintained constant while simultaneously introducing weighting which maintains constant the relative signal levels between channels.

10 Claims, 5 Drawing Figures

SYSTEM FOR CHANGING SEISMIC DETECTION ARRAY LENGTHS

This invention relates to seismic exploration, and more particularly to a system for the selective interconnection or mixing of signals from a plurality of seismic detectors spaced along a spread to change effective array length while maintaining constant the effective detector interval.

A typical marine seismic exploration crew tows a detector streamer behind a boat. A typical streamer has 48 or more live sections, a lead-in cable with stretch sections, and a tail buoy. The streamer is towed at a depth of about 50 feet. Thirty or more acceleration cancelling hydrophones per section is typical. Noise induced into the cable limits the signal-to-noise ratio of the marine seismic operations. Noise can be categorized as electrical, acoustic ambient, flow, shot generated, and boat generated noise. Various methods have been used to attenuate these noises.

Boat, shot generated noise and random type noise are attenuated by the in-line array of the multi hydrophones in the streamer. Since boat and shot generated noise have major components in the low frequency end of the seismic spectrum, the attenuation at low frequencies is heavily controlled by the length of the array. Increase in the array length moves the first notch of an in-line response lower. It is, therefore, desirable to use long arrays. Limits in the length are dictated by the frequency dependent attenuation due to normal moveout and dip. Therefore, it is desirable to be able readily to vary the array length.

This invention provides for the array length to be easily adjustable by electrical switching. Since the total recording system is linear, the equivalent effect of longer array lengths is effected by adding or summing the outputs of streamer sections within the recording system. This is done in such a way as to maintain the detector or trace interval constant. In addition, it can be done in such a way as to provide the effect of a weighted array.

Summing is accomplished by applying operational amplifiers to sum currents weighted by resistors at their inputs.

In accordance with the invention, a seismic surveying system is operated with a spread of seismic arrays which applies individual seismic signals, one from each array, to input channels leading to a recorder. A plurality of multi choice selectors are each connected at inputs thereof to a set of the input channels which lead from a set of arrays all pairs of which are contiguous in the spread and wherein the sets connected to selectors differ one from another in a series of sets by one array. An output line leads from each selector to the recorder.

Connections in each selector combine on each output line a summation of signals from input channels in number selectable from the number in the sets down to single channel signals to vary the effective array length while maintaining constant the array spacing.

For a more complete understanding of the present invention and for further objects and advantages thereof, reference may now be had to the following description taken in conjunction with the accompanying drawings in which.

Figure 1:
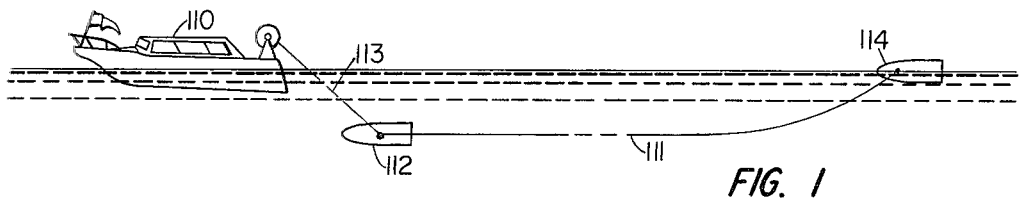
FIG. 1 illustrates a field operation in a marine area with a streamer towed at depth behind a boat.

Referring now to FIG. 1, a marine surveying operation is depicted wherein a boat 110 tows a seismic streamer 111 at a depth which is controlled by a vane 112 with towing forces being applied by way of a lead-in cable 113. A tail buoy 114 cooperates with the system to mark the end of the streamer 111. Systems such as shown in FIG. 1 move continuously along a given traverse. Explosive charges or other mechanical impulses periodically are produced either at the boat 110 or at a shooting boat trailing or otherwise accompanying boat 110 for the generation of seismic waves which are then detected in timed relation with the creation of each impulse. Resultant seismic waves are recorded as multi trace or channel recordings by apparatus carried in the boat 110. Typically, the streamer 111 would have 48 or more live sections. Each section may be of the order of 50 meters in length and contain thirty or more acceleration cancelling hydrophones therein. Hydrophones in each section are interconnected to a single output channel for each section. The sections are then mechanically coupled together so that they move in tandem behind boat 110. Signal channels from each section then extend forward and through the lead-in cable 113 where they are connected to amplifying circuits.

Figure 2:
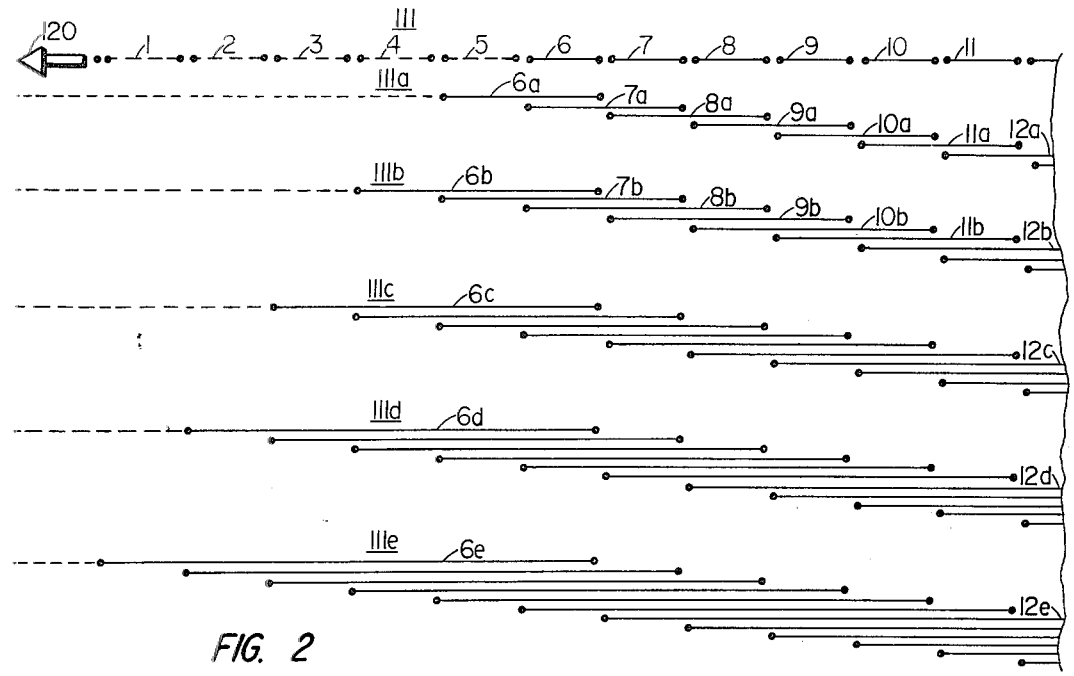
FIG. 2 illustrates variations available in accordance with the present invention in detector array length.

In FIG. 2, streamer 111 is shown comprising tandem arrays 1,2 ... 11 forming part of an $n$ array streamer. For the purpose of the present description, it may be considered that each of the arrays 1–11 includes a multiplicity of detectors all connected together so that in the lead-in cable extending in the direction of arrow 120 there will be a separate signal channel connecting each of the arrays 1,2 ... $n$ to a recording unit.

In the example to be now described, the recording unit produces records of 48 traces. In this example, the streamer 111 will include 53 arrays, i.e., $n = 53$. In such case, the arrays 1,2 ... $n$ each may be considered to be 50 meters in length. The present invention provides for varying the effective array lengths. That is, if each array is 50 meters in length, a recording can be made by using arrays 6,7 ... 53 wherein each trace then has an effective trace length of 50 meters with the spacings between the centers of the arrays of 50 meters. However, if the streamer is operated in the manner illustrated for streamer 111a, arrays 5 and 6 would be interconnected to feed signals by summation to a single or first trace in the recording unit. Thus, the array length would be that of 6a or 100 meters. The second trace would have an effective 100 meter length of the array 7a with arrays 8a, 9a ... 11a being illustrated. While the array length is 100 meters, the spacing between the centers of the arrays still is 50 meters.

In an interconnection arrangement illustrated for streamer 111b, the array 6b is 150 meters in length. Array 7b similarly is 150 meters in length with arrays 8b,9b ... 11b also being shown. The arrays are 150 meters in length with 50 meters between centers.

Similarly, in streamer 111c, array 6c is 200 meters in length as is arrays 7c,8c ... 11c. In streamer 111d, each array $6d, 7d \ldots 11d$ is 250 meters in length with 50 meters between centers. In spread $111e$, arrays $6e, 7e \ldots 11e$ are 300 meters in length but with 50 meters between centers.

In the embodiment of the present invention here illustrated, there is provision for selective interconnection at the recording unit so that any one of the array lengths illustrated in FIG. 2 can be selected while maintaining a predetermined relationship between signal levels.

Figure 3:
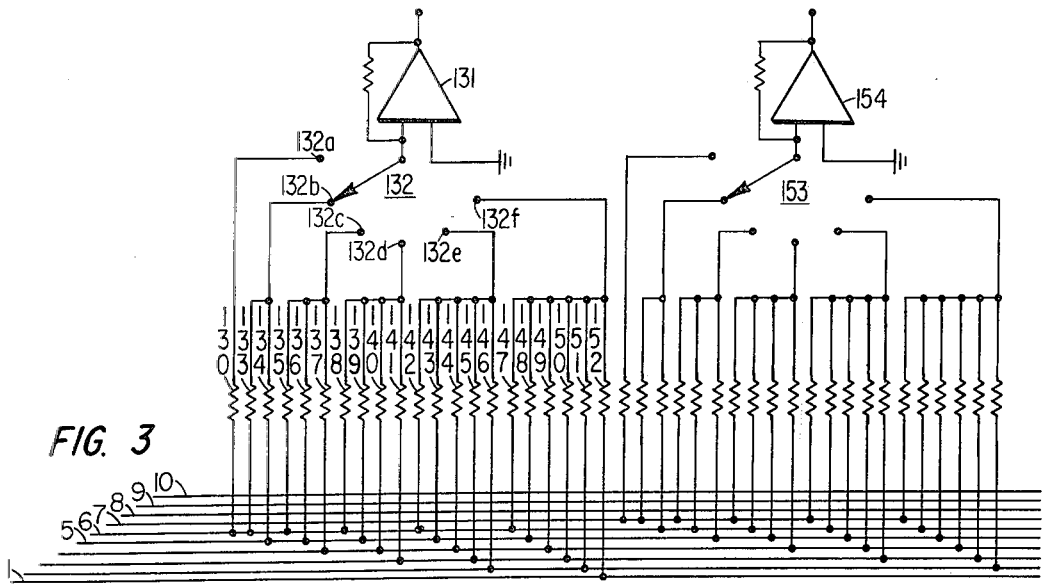
FIG. 3 is a schematic diagram of weighted input switching for selecting the variations shown in FIG. 2.

One manner of carrying out the foregoing selection is illustrated in FIG. 3 wherein only channels $1, 2 \ldots 10$ of the 53 channels above mentioned are indicated. Preferably, channels $1, 2 \ldots 10$ will be output channels from a preamplifier stage in the system such as the well known DFS III and DFS IV seismic surveying systems manufactured and sold by Texas Instruments Incorporated. In such systems, a preamplifier stage is provided to receive and amplify input signals from the lead-in cable 113. The preamplifier stage includes antialias filters. Thus, the lines $1, 2 \ldots 10$ of FIG. 3 may be considered to be outputs from such alias filters.

A selection unit is inserted into the system with the equivalent of unity gain. This means that all 48 channel outputs will be one when all 53 outputs of the antialias filters are one regardless of the setting of the number of channels to be summed. In the embodiment here described, each seismic trace may comprise from one to six inputs combined. Cooperation between selector switches plus weighting resistors control signals applied to the inputs of operational amplifiers and permits the insertion of the selection system without modifying in any way the operation of the remainder of the system.

More particularly, as shown in FIG. 3, channel 6 is connected by way of resistor 130 to contact $132a$ of a selector switch 132. Resistors 133 and 134 connect channels 6 and 5 to contact $132b$. Resistors 135, 136 and 137 connect channels 6, 5 and 4 to contact $132c$. Resistors 138–141 connect channels 6, 5, 4 and 3 to contact $132d$. Similarly, resistors 142–146 connect channels 6, 5, 4, 3 and 2 to contact $132e$ and resistors 147–152 connect channels 6, 5, 4, 3, 2 and 1 to contact $132f$.

The selector arm on switch 132 is then connected to one input of an operational amplifier 131 whose output may then be connected into the appropriate No. 1 trace of the multi trace recording system in the boat 110.

In a similar manner, connections lead from channels 7, 6, 5, 4, 3 and 2 by way of a selector switch 153 to an operational amplifier 154. The output of amplifier 154 may then be connected to the second trace of the multi trace recording system.

In similar manner, the remainder of the channels 8, $9 \ldots 53$ may be selected for mixing and application to a recorder.

Preferably, the remaining resistors illustrated in FIG. 3 are selected in accordance with weighting factors which are the multiply factor for an input with the assumption that the total summing system always has unity gain. For example, if a sine wave of magnitude equal to one were applied in parallel on all of the channels $1, 2 \ldots 53$, the output such as appears at the output terminals of amplifiers 131 and 154, etc. would all have a magnitude of one regardless of the switch position selection. To achieve this end, the weighting set out in Table I will be employed.

Table I relates the effective array length to the input channels to be summed, the weighting factors to be applied, and the corresponding output channel.

A shorthand notation may be used to describe the particular complements of array channels to be summed at the various selector outputs. In the preferred embodiment having $n$ array channels, each of the selector switches will have a given number of input contacts or sections, this number being designated as $m$. The number of selectors required in the preferred embodiment is given by the quantity $n-m+1$. For purposes of explication define a variable $x$ which may have any non-negative integer value not greater than the quantity $n-m$. In the embodiment of FIG. 3 where $n=53$ and $m=6$, the set of values of $x$ is given by the series $0, 1, \ldots, 46, 47$. If one of these values of $x$ is used in the second series $n-x$; $n-x$ and $n-x-1$; $n-x, n-x-1$, and $n-x-2$; $\ldots$; $n-x, n-x-1, \ldots, n-x-(m-2), n-x-(m-1)$, this second series is seen to describe the various sets of array channels which can be summed in a weighted fashion at one of the selector outputs of FIG. 3. If the value $x=47$ is used for example, the second series takes the specific form 6; 6 and 5; 5 and 4; 6,5,4 and 3; 6,5,4,3 and 2; 6,5,4,3,2 and 1. This series is seen to be descriptive of the six different combinations of array channels that can be formed at the output of selecter 132. Similarly if the value $x=0$ is used, the second series becomes 53; 53 and 52; 53,52 and 51; 53,52,51 and 50; 53,52,51,50 and 49; 53, 52,51,50,49 and 48. This series is descriptive of the six different combinations of array channels that can be formed at the output of the last of the 48 selectors (not shown expressly in FIG. 3). Use of intermediate values of $x$ in the second series will give the respective complements of array channel combinations for the other 46 selectors.

Shorthand notation can also be used to describe an aspect of the array channel-selector segment connections. Define a variable $y$ which may have any integer value greater than $m-2$ but not greater than $n-m$. For the values of $n$ and $m$ above, the possible values of $y$ are given by the series $5, 6, \ldots, 46, 47$. Then any given array channel will be connected (through appropriate weighting resistors in the embodiment of FIG. 3) to section $m$ of selector $n-y$, to section $m-1$ of selector $n-y-1, \ldots,$ and to section $m-(m-1)$ of selector $n-y-(m-1)$. If the value $y=47$ is used for example, it is seen that some array channel will be connected to section 6 of selector 6, to section 5 of selector 5, to section 4 of selector 4, to section 3 of selector 3, to section 2 of selector 2 and to section 1 of selector 1. The array channel so connected in FIG. 3 is channel 6 where the selector input having the $a$ designation is section 1 and the selector input having the $f$ designation is section 6. Similarly if the value $y=5$ is used, it is seen that some array channel will be connected to section 6 of selector 48, to section 5 of selector 47,—and to section 1 of selector 43. The channel so connected is channel 53. Similar connections for array channels 7–52 are provided by the intermediate $y$ values.

TABLE 1

| Position Switch (Meters) | Inputs | Weights | Output Channel |
| --- | --- | --- | --- |
| 50 | 53 | 1 | 48 |

TABLE 1-Continued

| Position Switch (Meters) | Inputs | Weights | Output Channel |
|---|---|---|---|
| 100 | 6<br>53,52 | 1/2,1/2 | 1<br>48 |
| 150 | 6,5<br>53,52,51 | 1/3,1/3,1/3 | 1<br>48 |
| 200 | 6,5,4<br>53,52,51,50 | 1/6,1/3,1/3,1/6 | 1<br>48 |
| 250 | 6,5,4,3<br>53,52,51,50,49 | 1/8,1/4,1/4,1/4,1/8 | 1<br>48 |
| 300 | 6,5,4,3,2<br>53,52,51,50,49,48 | 1/14,1/7,2/7,2/7,1/7,1/14 | 1<br>48 |
| | 6,5,4,3,2,1 | | 1 |

Figure 4:
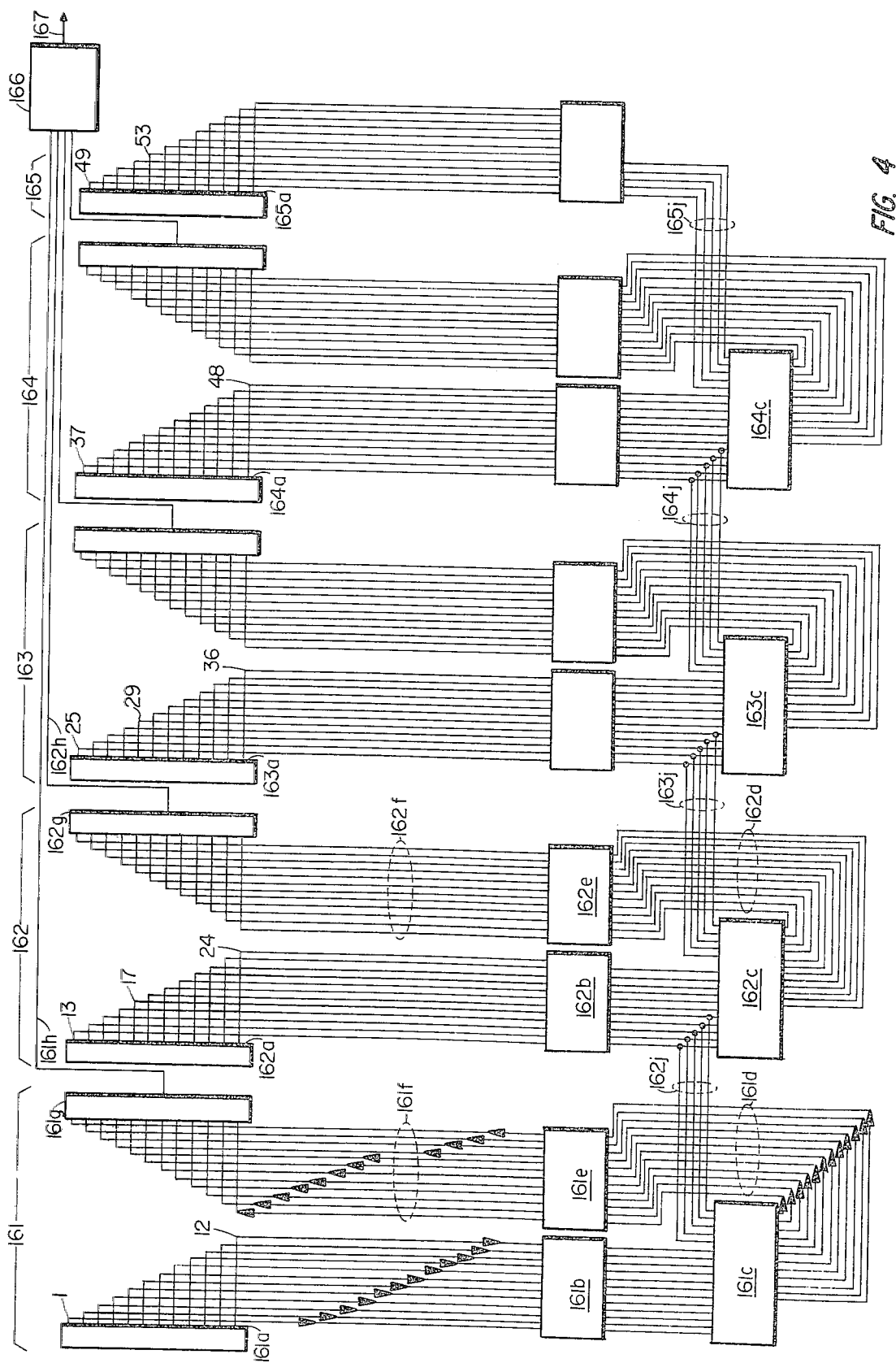
FIG. 4 illustrates the system arrangement in block form for the details shown in FIG. 3.

FIG. 4 illustrates the cabling of a field system wherein there are five modules of 12 input and 12 output channels in each of four modules and five input channels on the fifth module.

Modules 161–165 have input units 161a–165a each of which includes preamplifiers and alias filters (not shown). The 12 channels from unit 161a lead to a bank of buffer amplifiers 161b. The outputs from the amplifiers in bank 161b are then applied to a bank of switches and summing resistors 161c. The summing resistors then lead by way of lines 161d to the summing amplifier 161e. The output lines 161f then lead to an output module which in the DFS system above mentioned is a multiplexer 161g which has an output line 161h leading to a module multiplexer 166. The output line 167 then leads from module multiplexer 166 to further recording and/or processing equipment.

In a similar way, module 162 includes a bank of preamplifiers and aliasing filters 162a whose outputs are applied to buffer amplifiers 162b. The output of amplifiers 162b are then applied to a switching and weighting unit 162c. The outputs of unit 162c are then applied by way of lines 162d to the bank of summing amplifiers 162e. Output lines 162f then lead to multiplexer 162g to feed the output line 162h.

It will be noted that channels 13–17 leading from module 162a pass through module 162b and are connected by way of channels 162j to the last four inputs of unit 161c. In a similar manner, channels 163j interconnect five channels 25–29 of module 163 to the last five inputs on the switching bank 162c. Channels 164j serve a similar function for the switching module 163c. In input module 165a only five channels are employed, they lead by way of channels 165j to the last five inputs of the switching module 164c.

Figure 5:
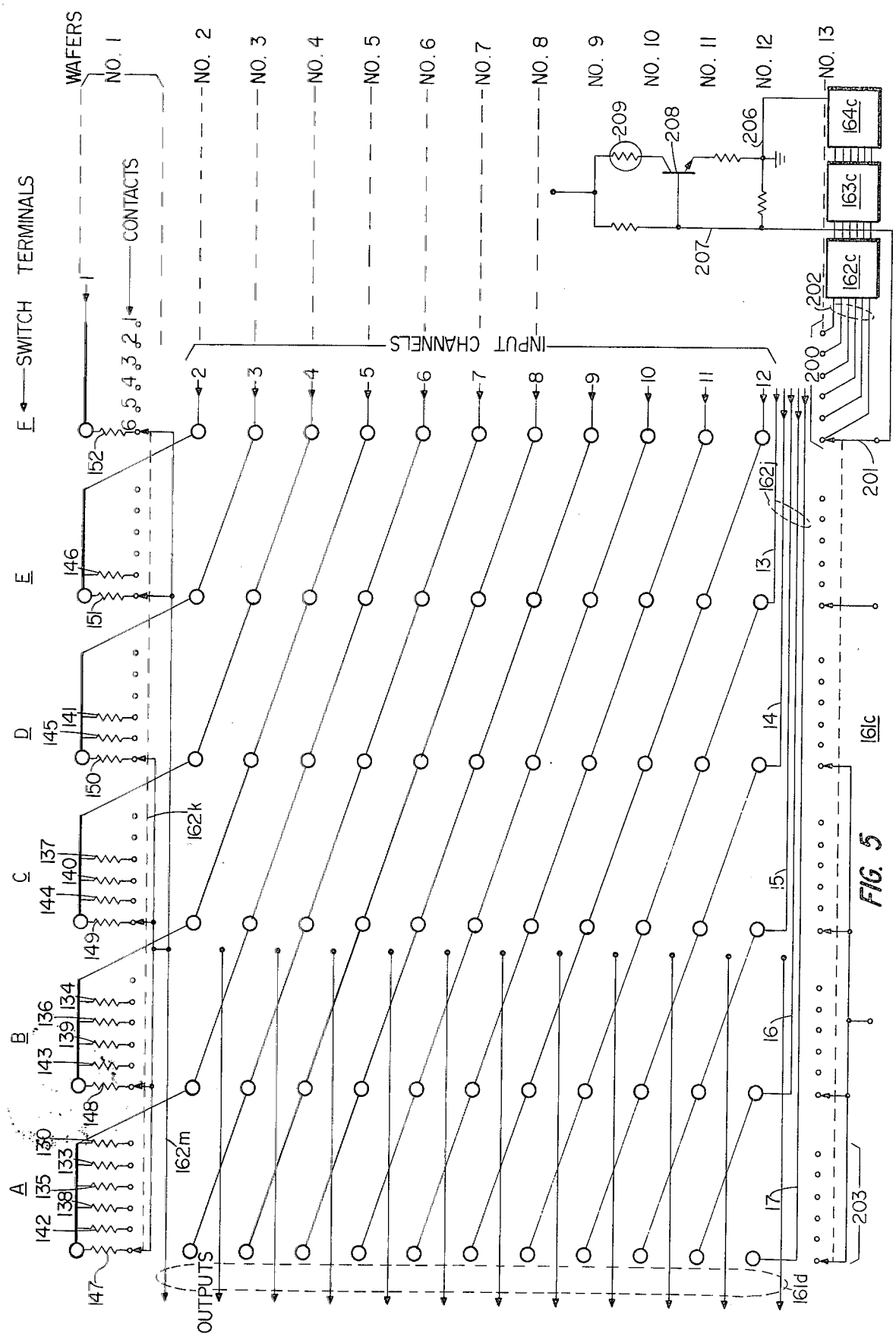
FIG. 5 is a detailed interconnection arrangement on a switch employed in one of the units of FIG. 4.

The switching and weighting modules 161c–164c are of the type schematically illustrated in FIG. 3 and illustrated in further detail in FIG. 5.

Because of the necessity of terminating and switching a large number of channels into several different combinations, four multi unit manually actuated switches were employed. This represents the preferred mode of carrying out the invention. Each of the four switches employed was a thirteen wafer, six-pole six position per wafer switch manufactured by Oke Manufacturing Company, Crystal Lake, Illinois.

One of four switch units employed is illustrated in FIG. 5 as comprising 13 separate wafers in which the input channels 1,2 . . . 12 are connected directly to the first 12 wafers. The thirteenth wafer is employed for control purposes. The first five channels of the second set of 12 inputs, i.e., inputs 13–17, are connected by channel 162j to selected terminals on wafer 12.

Wafer No. 1 is shown in detail with six sets of weighting resistors. The remaining wafers 2,3 . . . 12 are supplied with the same six sets, the latter not being shown in detail. Input channel 6 is connected to terminal F of wafer No. 6, terminal E of wafer No. 5, terminal D of wafer No. 4, terminal C of wafer No. 3, terminal B of wafer No. 2 and terminal A of wafer No. 1. Terminal A has six weighting resistors 130, 133, 135, 138, 142 and 147, one connected to each of the six switch contacts 1–6, respectively, associated with terminal A.

Input channel 5 is connected to terminal F of wafer No. 5, terminal E of wafer No. 4, terminal D of wafer No. 3, terminal C of wafer No. 2 and terminal B of wafer No. 1. Resistor 134 is connected to switch contact 2 of terminal B. Resistors 136, 139, 143 and 148 are connected to contacts 3–6, respectively, associated with terminal B.

Input channel 4 is connected to terminal F of wafer No. 4, terminal E of wafer No. 3, terminal D of wafer No. 2 and terminal C of wafer No. 1. Resistors 137, 140, 144 and 149 of FIG. 3 are connected to contacts 3–6, respectively, associated with terminal C.

Channel 3 is connected to terminal F of wafer No. 3, terminal E of wafer No. 2, and terminal D of wafer No. 1. Resistors 141, 145 and 150 are connected to contacts 4, 5 and 6, respectively, associated with terminal D. Channel 2 is connected to terminal F of wafer No. 2 and terminal E of wafer No. 1. Resistors 146 and 151 are connected to contacts 5 and 6, respectively, associated with terminal E.

Channel 1 is connected to terminal F of wafer No. 1 with resistor 152 being connected to the switch contact 6 associated with terminal F.

As above indicated, wafers 2,3 . . . 12 will each have six sets of weighting resistors connected in the same pattern as shown in FIG. 5 for wafer No. 1. The six selector arms on wafer No. 1, one for each set of six switch contacts, are mechanically common as indicated by dotted line 162k. They are also electrically common as indicated by the connections to the output channel 162m leading from wafer No. 1.

The resistors employed in this embodiment are set out in Table II.

TABLE II

| | |
|---|---|
| R 130 | 5 k ohms |
| R 133 | 10 k ohms |
| R 134 | 10 k ohms |
| R 135 | 15 k |
| R 136 | 15 k |
| R 137 | 15 k |
| R 138 | 30 k |
| R 139 | 15 k |
| R 140 | 15 k |
| R 141 | 30 k |
| R 142 | 40 k |

TABLE II-Continued

| | |
|---|---|
| R 143 | 20 k |
| R 144 | 20 k |
| R 145 | 20 k |
| R 146 | 40 k |
| R 147 | 70 k |
| R 148 | 35 k |
| R 149 | 17.5 k |
| R 150 | 17.5 k |
| R 151 | 35 k |
| R 152 | 70 k |

The weighting factors of Table II provide a particular in-line response. It will be understood that different in-line responses may be provided by using weighting factors which differ from those set out in Table II, the selection being in accordance with practices known in the seismic art.

The 12 output lines 161d of FIG. 5 correspond with like channels shown in FIG. 4. Similarly, the five cross input channels 162j correspond to the similar channels in FIG. 4. Thus, it will be understood that there will be four switch units of the type shown in FIG. 5.

In operation, it is highly desirable that all four switch units be set the same so that seismic traces will be produced on a uniform basis.

Wafer No. 13 on each of the five switch units is employed to signal to an operator when all four switches are not of uniform setting. Wafer No. 13 of the switch unit of FIG. 5 has six contacts 200 associated with selector arm 201. Contacts 200 are connected by way of channels 202 through wafer No. 13 of the switch in unit 162c. The channels 202 would be connected in unit 162c to contacts corresponding to contacts 203 of the switch of FIG. 5. Similarly, the contacts in unit 162c corresponding to contacts 200 would be connected through switch 163c. In a similar manner switch 163c is connected into switch 164c. The output selector arm of switch 164 (not shown) is then connected to ground by line 206. The selector arm 201 is connected by line 207 to the base of transistor 208. If there is lack of continuity through switches in units 161c, 162c, 163c and 164c as viewed from lines 206 and 207, then transistor 208 is turned on to energize warning lamp 209. Lamp 209 thus will signal to an operator that switch units 161c–164c are not uniformly set.

The foregoing example has dealt with a seismic streamer in which the arrays are 50 meters in length and in which six different switching arrangements are provided so that any one of 50, 100, 150, 200, 250 and 300 meter arrays can be selected while maintaining a 50 meter center spacing. It will be apparent that more or less possibilities can be made available by enlarging or diminishing the switching capability.

In the example given, it will be noted from FIG. 2 that the interval between the lead-in cable (not shown) and the center of each of the effective arrays decreases as the array length increases. That is, the center of array 6 in streamer 111 is 25 meters farther from the lead end of the streamer than the center of the array 62 for streamer 111a. Similarly, array 6b of streamer 111b has a center which will be 50 meters closer to the boat than the center of array 6. It will be understood that the switching arrangement may be wired differently than shown in FIGS. 3 and 5 so that the array center would remain approximately fixed. In so doing, the arrays 6a and 6b of FIG. 3 would be as shown. However, an array different than array 6b would comprise the sum of arrays 5, 6 and 7 so that the center would be at the same point as the center of array 6.

While a four unit manually operable thirteen wafer, six section, six position switch system has been described, it will be understood that the same result can be achieved using a plug board suitably equipped with weighting resistors. Alternatively, the switching can be done electronically.

The DFS system referred to above and of which the modules 161–166 of FIG. 4 form a part may be of the type described and claimed in U.S. Pat. No. 3,134,957 to Foote et al. Elements 161b, 161c, 161d, 161e, etc. are not part of DFS. DFS Models III and IV have been manufactured and sold by Texas Instruments Incorporated of Dallas, Texas for use throughout the world and are further described in manuals published by Texas Instruments Incorporated and distributed to purchasers and users thereof.

Having described the invention in connection with certain specific embodiments thereof, it is to be understood that further modifications may now suggest themselves to those skilled in the art and it is intended to cover such modifications as fall within the scope of the appended claims.

What is claimed is:

1. Means for varying the effective seismic detector array length while maintaining constant the effective detector array spacing in a seismic surveying system where an array channel from each detector array in a seismic spread leads to a multi-channel recorder, comprising:
   a. a plurality of multi-state input/output channel selectors, each connected at one input thereof to one of said array channels by means of first weighting means leading to first input terminals of said selectors,
   b. connections between pairs of said array channels from adjacent detector arrays each by means of pairs of second weighting means leading to second input terminals of said selectors, and
   c. means for selectively connecting inputs of said recorder to said first or said second output terminals of said selectors.

2. The combination set forth in claim 1 wherein said first weighting means and said second weighting means are of magnitude to maintain the same relative signal level applied to said recorder from said first output terminal as from second output terminal.

3. In a seismic surveying system where a spread a seismic arrays provide individual seismic signals, one from each array, for array channels leading to a recorder, the combination which comprises:

a plurality of multi choice selectors each connected at inputs thereof to a set of array channels numbered 1,2 . . . n, which lead from a set of correspondingly numbered arrays, wherein each consecutively numbered array in said set of arrays is contiguous in said spread with each numbered array adjacent to it, and wherein a consecutively numbered subset of the set 1, 2 . . . n connected to each of adjacent selectors differs in beginning and end numbers from those of the previous or following subset connected to the previous or following selector by one number;

an output channel leading from each said selector to said recorder; and connections in each said selector to combine on each said output channel a summation of signals from said array channels in number selectable from the number in said subsets down to single channel signals to vary the effective array length while maintaining constant the array spacing.

4. The combination set forth in claim 3 wherein said connections include weighting means of magnitude to maintain the same relative signal level applied to said recorder.

5. In a marine seismograph system where a plurality of traces are produced by energization of a multichannel recorder, the combination which comprises:
   a. a streamer to be pulled through the water along a seismic traverse having a plurality of like detector sections where each section contains a plurality of detectors whose output signals are combined for each section on array channels leading to said recorder individual to each section,
   b. a plurality of multistate input/output channel selectors, each having an output terminal connected to an input trace of said recorder and each connected at one input thereof to the array channel from one said section by means of first weighting means,
   c. a connection at each of the selectors between pairs of said array channels from adjacent detector sections each by means of a pair of second weighting means the junction between said pair of second weighting means leading to a second input terminal of the corresponding selector, and
   d. means for selectively connecting the output terminal of each selector to the first or second input terminal of said selector.

6. The combination set forth in claim 5 wherein said first weighting means and said second weighting means are of magnitude to maintain constant the relative levels of signals applied to said recording from said first and second input terminals.

7. The combination set forth in claim 5 wherein means are provided to signal any differences in setting of said selectors.

8. In a system where $n$ seismic array channels transmit signals from a spread made up of contiguous end-to-end seismic arrays $1, 2 \ldots n$, the combination which comprises:
   a set of $n-m+1$ selectors of $m$ sections per selector,
   connections in said selectors to selectably combine on each selector output summations of signals from seismic array channels the selectable combinations on any given selector output comprising the weighted summations of sets of said array channels included within the series $n-x$; $n-x$ and $n-x-1$; $n-x$, $n-x-1$ and $n-x-2$; . . .; $n-x$, $n-x-1$, . . . , $n-x-m+2$ and $n-x-m+1$
   where $x$ is any non-negative integer not greater than $n-m$ and each different value of $x$ defines said series for a different selector.

9. In a system where $n$ seismic array channels transmit signals from a spread of contiguous end-to-end seismic arrays $1, 2 \ldots n$, the combination which comprises:
   a set of $n-m+1$ selectors of $m$ sections per selector
   a plurality of couplings between said selectors each of said couplings comprising connections between one of said array channels and a set of selector sections consisting of section $m$ of selector $n-y$, section $m-1$ of selector $n-y-1$, . . . section $m-(m-1)$ of selector $n-y-(m-1)$
   where $y$ is any integer greater than $m-2$ but not greater than $n-m$, and
   connections between adjacent array channels and adjacent selectors to selectably provide on each selector output summations of signals from seismic array channels the selectable combinations on any given selector output comprising the summations of sets of said array channels included within the series $n-x$; $n-x$ and $n-x-1$; $n-x$, $n-x-1$ and $n-x-2$; . . .; $n-x$, $n-x-1$, . . . , $n-x-(m-2)$ and $n-x-(m-1)$
   where $x$ is any non-negative integer not greater than $n-m$ each different value of $x$ defining said series for a different selector and wherein each of said connections includes weighting means of magnitudes such that the signal level at the output of any selector in response to identical signals on all of said array channels is independent of the specific output summation selected.

10. In a seismic surveying system where a spread of seismic arrays provide individual seismic signals, one from each said array, to array channels leading to a recorder, the combination which comprises:
    a plurality of multi wafer, multi section selector switches having output contacts for each wafer connected in parallel and each section connected to a different array channel and where the array channels connected to a given selector wafer are from contiguous arrays in said spread and wherein the sets connected to the wafers of said selectors differ one from another in a series of said sets by one array, and
    connections in each said selector wafer to combine at each said output contact a summation of signals from said array channels in number selectable from the number in said sets down to single channel signals to vary the effective array length while maintaining constant the array spacing.

* * * * *